United States Patent Office 2,751,987
Patented June 26, 1956

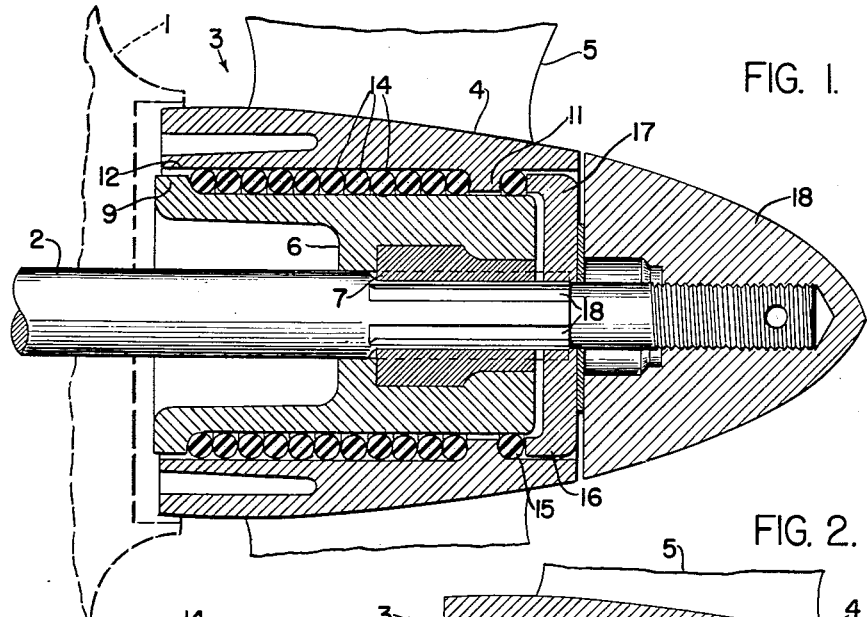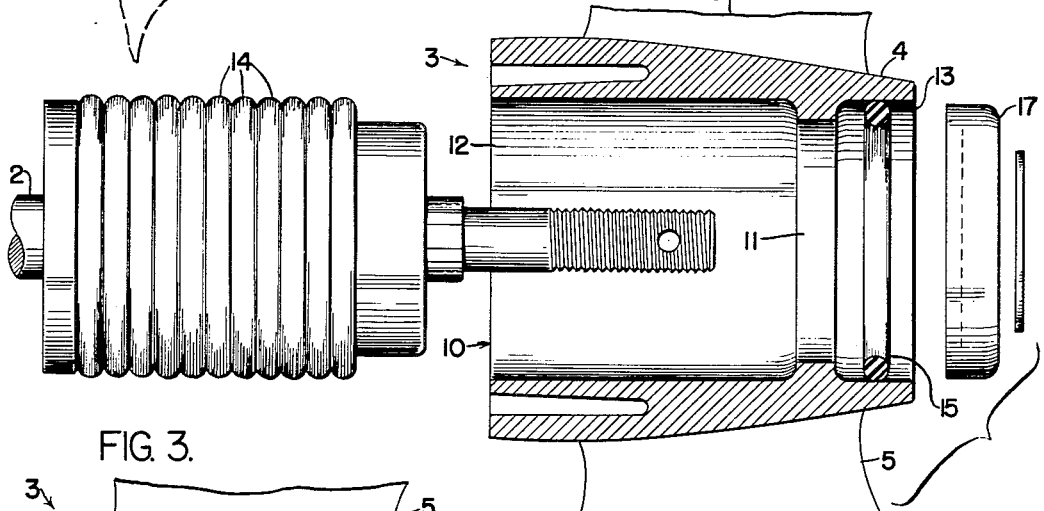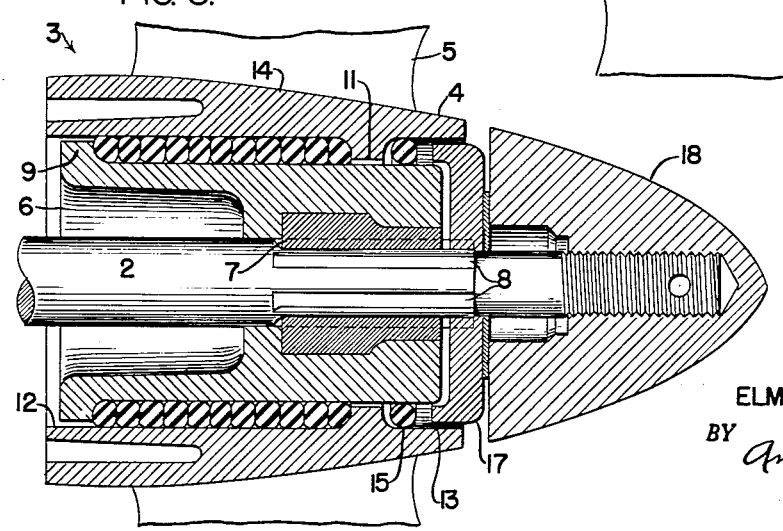

2,751,987

RESILIENT PROPELLER MOUNTING AND SLIP CLUTCH RESPONSIVE TO PROPELLER THRUST

Elmer C. Kiekhaefer, Cedarburg, Wis.

Application September 14, 1953, Serial No. 379,878

2 Claims. (Cl. 170—135.75)

This invention relates to propellers for outboard motors and the like and particularly to mounting of the propeller to protect the same against damage due to striking submerged objects.

The invention provides a series of clutch elements in the form of rubber O-rings mounted on the propeller shaft to support the propeller hub. The elements provide the resilient support of the propeller and are movable and compressible axially of the propeller shaft to be expanded radially for driving the propeller by their frictional engagement with the propeller shaft and propeller hub.

An object of the invention is to provide a resilient propeller mounting which allows the propeller limited movement on the shaft to minimize damage to the propeller in striking a submerged object.

Another object of the invention is to provide such resilient means which will effect the drive of the propeller under normal conditions and allow the shaft to rotate independently of the propeller as when the propeller strikes such a submerged object.

Another object is to provide greater protection of the propeller against damage throughout the range of operation of the motor.

Another object is to provide clutch means which will allow slippage of the shaft relative to the propeller upon overload and is responsive to the propeller thrust to increase the capacity of the clutch in response to the propeller thrust while allowing the resilient mounting of the propeller with respect to the shaft.

Another object is to provide the combined resilient support of the propeller and slip clutch device within the propeller hub.

Another object is to facilitate assembly and disassembly of the propeller hub and resilient mounting and clutch means therefor.

Another object is to provide a slip clutch device which is substantially uneffected by sand.

These and other objects and advantages of the invention will be more fully set forth in the following description of a preferred embodiment of the invention as illustrated in the accompanying drawings.

In the drawings:

Figure 1 is a longitudinal sectional view of the propeller hub with the blades of the propeller broken away and showing a part of the gear case unit of an outboard motor in dotted lines;

Fig. 2 shows the propeller shaft and bushing mounted on the propeller shaft and resilient clutch elements in elevation with the propeller hub sectioned and shown disassembled from the propeller shaft; and Fig. 3 is a view similar to Figure 1 showing the resilient clutch elements expanded to increase the clutch capacity of the drive as in high-speed operation of the outboard motor.

In the drawings, the outboard motor lower end unit 1, shown in dotted lines, carries the propeller shaft 2 which extends rearwardly of the unit. The propeller 3 mounted on shaft 2 rearwardly of the unit includes the central hub 4 and the blades 5. The cylindrical bushing 6 is mounted on shaft 2 rearwardly of the lower unit 1 and is provided with the splined insert 7 which fits the splines 8 of shaft 2. Bushing 6 is fixed on shaft 2 and includes the radially projecting rim or annular flange 9 at the forward end of the bushing. Hub 4 of propeller 3 is provided with an axial, center bore 10 which extends generally the length of the hub and is of a diameter which allows the hub to be mounted over bushing 6 and which allows, in addition, limited angular movement of the propeller. The circular rib 11 formed integrally with hub 4 is disposed adjacent to the rear end of the propeller hub and separates the forward clutch face 12 and rear clutch face 13.

According to the invention, the clutch elements 14 and 15 are mounted on bushing 6 within bore 10 of hub 4 to provide the resilient support for the propeller and the frictional, rotational drive of the propeller by the shaft 2. Elements 14 are mounted on bushing 6 between flange 9 of the bushing and rib 11 of the propeller hub. The element 15 is mounted rearwardly on bushing 6 between rib 11 and the annular flange 16 of disc 17 carried by shaft 3. Each element comprises a molded synthetic rubber ring of circular transverse section having an inner dimension which fits the bushing easily and an outer dimension which fits slidably within the hub to engage the faces 12 and 13 of the hub and support the hub resiliently on the bushing. Disc 17 is disposed within the rear end of hub 4 with flange 16 thereof to form an abutment at the rear end of bushing 6 and is rotationally fixed with respect to shaft 2 by the splines 8 of the shaft and secured by the tapered nut 18 mounted on the threaded end 19 of shaft 2. Nut 18 is of generally conical shape and the combined outer dimensions of nut 18 and hub 4 provide for the smooth streamlined flow of water over the hub and past the propeller.

In the operation of the outboard motor, the driving torque of shaft 2 is transmitted to hub 4 of propeller 3 by the frictional engagement of elements 14 and 15 with the bushing 6 and with the faces 12 and 13 of hub 4.

Elements 14 and 15 support propeller 3 exclusively and allow limited deflection of the propeller as when a blade 5 strikes an object so that the damage to the propeller is minimized or avoided according to the degree of deflection which the clearance between hub 4 and bushing 6 allows.

In the event that the rotation of the propeller is interrupted by the submerged object, the slippage of elements 14 and 15 between bushing 6 and hub 4 allows shaft 2 rotation separately of the propeller until the propeller has cleared the object.

According further to the invention, the clutch elements 14 are compressible axially between flange 9 and rib 11 by the forward thrust of the propeller which causes the elements to expand radially and increases the frictional engagement of the elements with bushing 6 and face 12 of the propeller hub.

As the thrust of the propeller increases, the capacity of the clutch driving the propeller increases automatically with the torque to be transmitted from shaft 2 to the propeller.

With the reverse thrust of the propeller, clutch element 15 is compressed between rib 11 of hub 4 and flange 16 of disc 17 to provide the reduced torque transmission required for reverse propeller rotation.

The size, number and compressibility of the clutch elements employed is determined by the maximum requirements of the propeller. When the motor is operating at any reduced speed, the reduced thrust of the propeller effects a corresponding reduced clutch capacity. The clutch elements are allowed to slip more readily in the event the propeller strikes an object and the protection of the propeller against damage is increased accordingly.

The effect of the propeller thrust in increasing the clutch capacity with increased torque prevents the clutch elements from slipping under any normal operating conditions.

Various embodiments of the invention may be employed within the scope of the following claims.

I claim:

1. A marine propeller assembly for driving a propeller having a different thrust in each direction and providing the resilient support for the propeller on the shaft, a bushing for the shaft and having a cylindrical surface, an annular abutment member at each end of said bushing, a plurality of O-rings of resilient material of circular cross-section, said O-rings being mounted on said bushing between said abutments, each O-ring comprising a separate element movable axially on said bushing and compressible axially and radially respecting the shaft, and a cylindrical sleeve forming part of the propeller hub and mounted on the said O-rings to provide resilient support of the propeller, said sleeve having an annular rib extending between two of said O-rings and axially engageable therewith to secure the propeller axially of the propeller shaft, given numbers of said O-rings being disposed between said annular rib and said annular abutment members, a greater number of O-rings in one direction of said rib providing the greater torque capacity so that the thrust of the propeller in response to the rotation of the shaft in each direction moves the propeller axially of the shaft and selectively effects the compression of the corresponding given number of said O-rings in each corresponding direction whereby the torque capacity provided by the driving engagement thereof is proportional to the different torque requirements necessary for the rotation of the propeller in each direction.

2. In a marine propeller assembly including a shaft for supporting the propeller for rotation, a propeller having a hub and a series of blades carried by the hub, a drive bushing fixed on said shaft and having a cylindrical surface concentric with respect to said shaft, means providing radially extending annular abutments located forwardly and rearwardly of said bushing, said hub having a central axial bore substantially larger than said bushing and an annular abutment formed within said hub between the ends thereof, and a series of resilient clutch elements mounted on said drive means between the abutments thereof and forwardly and rearwardly of the annular abutment of the propeller hub, each element comprising a ring of circular transverse section having inner and outer dimensions normally fitting said bushing and hub respectively and responsive to compression by the relative axial movement of said hub on the drive means effecting the radial expansion of the corresponding elements into frictional engagement with the bushing and propeller hub to maintain the torque capacity of the elements above the torque required to drive the propeller in the corresponding direction while resiliently supporting the propeller.

References Cited in the file of this patent

UNITED STATES PATENTS

| | | |
|---|---|---|
| 2,111,245 | Irgens | Mar. 15, 1938 |
| 2,125,270 | Conover | Aug. 2, 1938 |
| 2,420,718 | Odelius | May 20, 1947 |
| 2,501,984 | Alward | Mar. 28, 1950 |
| 2,533,235 | Feek | Dec. 12, 1950 |
| 2,647,772 | Wernert | Aug. 4, 1953 |
| 2,672,115 | Conover | Mar. 16, 1954 |

FOREIGN PATENTS

| | | |
|---|---|---|
| 697,252 | Germany | Oct. 9, 1940 |